(12) United States Patent
Koyama et al.

(10) Patent No.: US 9,016,128 B2
(45) Date of Patent: Apr. 28, 2015

(54) EXTERNAL FORCE DETECTING METHOD AND EXTERNAL FORCE DETECTING DEVICE

(75) Inventors: Mitsuaki Koyama, Sayama (JP); Takeru Mutoh, Sayama (JP); Hiroki Iwai, Sayama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 432 days.

(21) Appl. No.: 13/374,759

(22) Filed: Jan. 10, 2012

(65) Prior Publication Data

US 2012/0180567 A1 Jul. 19, 2012

(30) Foreign Application Priority Data

Jan. 17, 2011 (JP) ................................. 2011-006894
Mar. 31, 2011 (JP) ................................. 2011-079938
Jun. 21, 2011 (JP) ................................. 2011-137519

(51) Int. Cl.
| | | |
|---|---|---|
| *G01H 13/00* | (2006.01) | |
| *G01P 15/097* | (2006.01) | |
| *G01P 1/00* | (2006.01) | |
| *G01P 1/02* | (2006.01) | |
| *G01P 15/125* | (2006.01) | |
| *G01L 1/14* | (2006.01) | |
| *G01L 1/16* | (2006.01) | |
| *G01P 15/08* | (2006.01) | |

(52) U.S. Cl.
CPC .................. *G01P 15/097* (2013.01); *G01P 1/00* (2013.01); *G01P 1/006* (2013.01); *G01P 1/023* (2013.01); *G01P 15/125* (2013.01); *G01P 2015/0828* (2013.01); *G01P 2015/0871* (2013.01); *G01L 1/142* (2013.01); *G01L 1/162* (2013.01)

(58) Field of Classification Search
CPC ...... G01N 13/00; G01N 29/12; G01N 29/022; G01N 29/036
USPC .......................................................... 73/579
See application file for complete search history.

(56) References Cited

U.S. PATENT DOCUMENTS

| | | |
|---|---|---|
| 6,005,275 A | 12/1999 | Shinogi et al. |
| 6,078,016 A * | 6/2000 | Yoshikawa et al. ........... 200/181 |
| 2003/0183004 A1* | 10/2003 | Furukubo et al. ............... 73/493 |
| 2006/0108995 A1 | 5/2006 | Bu et al. |
| 2007/0279153 A1 | 12/2007 | Ruby |
| 2008/0202239 A1* | 8/2008 | Fazzio et al. ............... 73/504.18 |

FOREIGN PATENT DOCUMENTS

| | | |
|---|---|---|
| CN | 1796952 | 7/2006 |
| CN | 101153825 | 4/2008 |
| DE | 195 31 058 | 3/1996 |
| EP | 1 041 717 | 10/2000 |
| JP | 2002-171152 | 6/2002 |
| JP | 2006-138852 | 6/2006 |
| JP | 2008-039626 | 2/2008 |
| TW | 201017174 | 5/2010 |

* cited by examiner

*Primary Examiner* — Hezron E Williams
*Assistant Examiner* — Mark A Shabman
(74) *Attorney, Agent, or Firm* — Jordan and Hamburg LLP

(57) ABSTRACT

A technique for detecting external force applied to a piezoelectric plate is provided. A crystal plate is cantilever-supported in a container. Excitation electrodes are formed on an upper face and lower face, respectively, of the crystal plate. A movable electrode is formed on the lower face side. A fixed electrode is provided on a bottom portion of the container facing the movable electrode. The excitation electrode on the upper face side and the fixed electrode are connected to an oscillation circuit. When the crystal plate bends by external force applied, capacitance between. A direction of the movable electrode along a length direction of the crystal plate is set to 30° to 60°, relative to a face orthogonal to an intended direction of the external force. The movable electrode and fixed electrode changes, and this capacitance change and a deformation of the crystal circuit.

6 Claims, 17 Drawing Sheets

A-A CROSS SECTION

TO DATA PROCESSING UNIT 101

83 REFERENCE FACE

EXTERNAL FORCE DETECTING METHOD AND EXTERNAL FORCE DETECTING DEVICE

BACKGROUND OF THE INVENTION

1. Field of the Invention

The present invention relates to a technical field for using a piezoelectric plate, for example a crystal plate, to detect the magnitude of external force acting on a piezoelectric plate based on an oscillation frequency, in order to detect external force such as acceleration, pressure, flow speed of fluid, magnetic force or electrostatic force.

2. Description of the Related Art

As external force acting on a system, there are force acting on an object based on acceleration, pressure, flow speed, magnetic force, electrostatic force, and the like, and it is often necessary to measure such external force accurately. For example, in the stage of development of the automobile, there is performed measurement of impact force to seats when the automobile collides with an object. Further, there are demands for checking acceleration of vibrations or the like as accurate as possible in order to check vibration energy and amplitude during an earthquake.

Furthermore, other examples of external force measurement are checking flow speed of liquid or gas accurately and reflecting detection values thereof to a control system, measuring performance of a magnet, and the like.

To perform such measurement, there are demands for high accuracy measurement with a structure as simple as possible.

Patent Document 1 describes that a piezoelectric film is cantilever-supported, supported, the piezoelectric film is deformed by a change in surrounding magnetic force, and an electric current flowing through the piezoelectric film changes.

Further, Patent Document 2 describes that there are provided a capacitive coupling type pressure sensor and a crystal oscillator disposed in a space partitioned from the area where this pressure sensor is disposed, a variable capacitor of the pressure sensor and the crystal oscillator are connected in parallel, and a pressure is detected by a change of an antiresonance point of the crystal oscillator by a change in capacitance in the pressure sensor.

These Patent Documents 1, 2 differ completely in principle from the present invention.

Patent Document 3 describes an invention in which a piezoelectric oscillating element cantilever-supported in a device is fixed in a state that a free end side is slightly lowered to a degree that the free end does not contact an inside bottom face. However, it can be conceived as a device for effectively utilizing an inside space of the device, and has an object different from that of the present invention.

Patent Document 1: Japanese Patent Application Laid-open No. 2006-138852 (paragraph 0021, paragraph 0028)

Patent Document 2: Japanese Patent Application Laid-open No. 2008-39626 (FIG. 1 and FIG. 3)

Patent Document 3: Japanese Patent Application Laid-open No. 2002-171152

SUMMARY OF THE INVENTION

The present invention is made under such a background, and an object thereof is to provide a technique which is capable of accurately and easily detecting external force applied to a piezoelectric plate.

An external force detecting method of the present invention uses a sensor including:

a cantilever piezoelectric plate supported at one end on a base;

one excitation electrode and another excitation electrode provided on one face side and another face side, respectively, of the piezoelectric plate so as to vibrate this piezoelectric plate;

an oscillation circuit connected electrically to the one excitation electrode;

a movable electrode for forming variable capacitor provided in a portion separated from the one end side on the piezoelectric plate and connected electrically to the other excitation electrode; and a fixed electrode provided separately from the piezoelectric plate to face the movable electrode and connected to the oscillation circuit, where capacitance between the fixed electrode and the movable electrode is changed by bending of the piezoelectric plate to thereby form a variable capacitor, and includes the steps of:

setting the sensor so that an angle formed between a face orthogonal to a direction of external force as an intended subject of measurement and a length direction of the piezoelectric plate in the movable electrode is 30° to 60°;

detecting a signal as frequency information corresponding to an oscillation frequency of the oscillation circuit by a frequency information detecting unit; and evaluating external force acting on the piezoelectric plate based on the frequency information detected in the frequency information detecting unit.

Desirably, the above-described angle formed between a face orthogonal to a direction of external force as an intended subject of measurement and a length direction of the piezoelectric plate in the movable electrode is 40° to 50°.

An external force detecting device of the present invention is an external force detecting device detecting external force acting on a piezoelectric plate, the device including:

the cantilever piezoelectric plate supported at one end on a base;

one excitation electrode and another excitation electrode provided on one face side and another face side, respectively, of the piezoelectric plate so as to vibrate this piezoelectric plate;

an oscillation circuit connected electrically to the one excitation electrode;

a movable electrode for forming variable capacitor provided on another end side of the piezoelectric plate and connected electrically to the other excitation electrode;

a fixed electrode provided separately from the piezoelectric plate to face the movable electrode and connected to the oscillation circuit, where capacitance between the fixed electrode and the movable electrode is changed by bending of the piezoelectric plate to thereby form a variable capacitor;

a frequency information detecting unit for detecting a signal as frequency information corresponding to an oscillation frequency of the oscillation circuit; and a direction indicating part indicating a direction of external force as an intended subject of measurement, in which an angle formed between a face orthogonal to a direction of external force as an intended subject of measurement and a length direction of the piezoelectric plate in the movable electrode is set to 30° to 60°, an oscillation loop is formed from the oscillation circuit, passing through the one excitation electrode, the other excitation electrode, the movable electrode, and the fixed electrode and returning to the oscillation circuit, and the frequency information detected by the frequency information detecting unit is for evaluating force acting on the piezoelectric plate.

Further, the method or device of the present invention may be structured such that a support part is provided on the base to support a portion between the excitation electrodes and the movable electrode on a lower face side of the piezoelectric plate, so as to prevent bending of the portion where the excitation electrodes are provided when external force is applied to the piezoelectric plate. In this case, a front end of the support part and the piezoelectric plate are fixed to each other with, for example, a fixing material.

Further, it may be structured to include on an internal wall part on a side where the fixed electrode is provided in the container, a projecting part allowing a contact of a portion shifted toward one end side from the other end side of the piezoelectric plate to restrict bending of this portion when the piezoelectric plate bends excessively, thereby avoiding collision of the other end of the piezoelectric plate with the inner wall part of the container. In this case, it can be structured such that with respect to a face of the projecting part which faces the piezoelectric plate, a vertical cross-sectional shape in a length direction of the piezoelectric plate is a mound shape.

The movable electrode for forming variable capacitor may be provided on either of the one face side and the other face side of the piezoelectric plate, or be provided on the both sides.

One preferred aspect of the present invention may be a structure in which a first group and a second group are provided, each group being formed of the piezoelectric plate, the excitation electrodes, the movable electrode, and the fixed electrode, oscillation circuits are provided corresponding to the first group and the second group, respectively, and the frequency information detecting unit has a function to obtain a signal corresponding to a difference between an oscillation frequency corresponding to the first group and an oscillation frequency corresponding to the second group. In this structure, the oscillation circuits can also be combined and shared by the first group and the second group. In this case, a switch unit can be provided between the oscillation circuit and loops so that an oscillation loop of the first group and an oscillation loop of the second group are formed alternately.

Further, desirably, the angle formed between a face orthogonal to a direction of external force as an intended subject of measurement and a length direction of the piezoelectric plate in the movable electrode is 40° to 50°.

In the present invention, when external force is applied to the piezoelectric plate and the piezoelectric plate bends or the degree of bending changes, a distance between the movable electrode on the piezoelectric plate side and the fixed electrode facing this movable electrode changes, capacitance between the both electrodes changes accordingly, and this capacitance change and a degree of bending of the piezoelectric plate are seen as a change in oscillation frequency of the piezoelectric plate. Further, by performing measurement with the piezoelectric plate being inclined with respect to a direction orthogonal to a direction of external force as an intended subject of measurement, measurement sensitivity is improved. Even a slight deformation of the crystal plate can be detected as a change in oscillation frequency, and thus external force applied to the piezoelectric plate can be measured with high accuracy and also the device structure is simple.

DETAILED DESCRIPTION OF THE PREFERRED EMBODIMENTS

Basic Structure of the Invention

Figure 1:
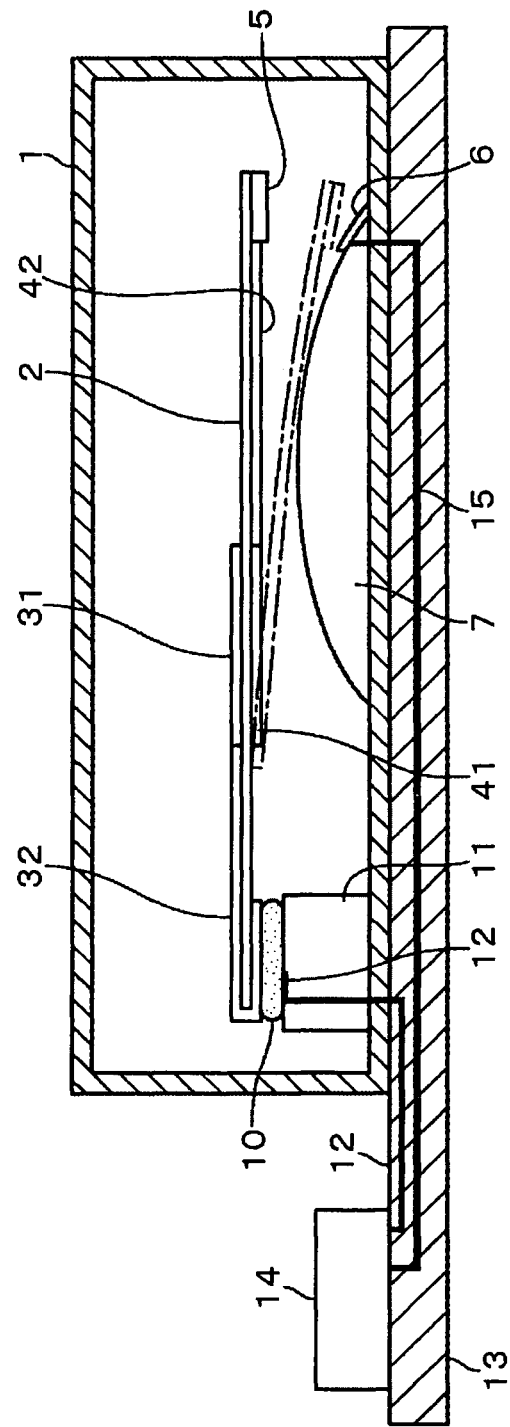
FIG. 1 is a cross-sectional side view illustrating a main part of a basic structure in which an external force detecting device according to the present invention is applied as an acceleration detecting device.

Before an embodiment applying the present invention to an acceleration detecting device is described, a basic structure as an assumption thereof will be described. FIG. 1 is a view illustrating an acceleration sensor corresponding to an external force detecting sensor as a sensor part of the acceleration detecting device. In FIG. 1, 1 denotes a sealed container formed of crystal for example in a rectangular parallelepiped shape, in which inert gas, nitrogen gas for example, is sealed. This container is made up of a lower part constituting a base and an upper part joined via a peripheral portion to the lower part. In addition, it is not always necessary to limit the container 1 to a sealed container. In the container 1, a pedestal 11 formed of crystal is provided, and one end of a crystal plate 2 as a piezoelectric plate is fixed to an upper face of this pedestal 11 with a conductive adhesive 10. That is, the crystal plate 2 is cantilever-supported onto the pedestal 11. The crystal plate 2 is formed of, for example, an X-cut crystal in a strip shape and has a thickness being set to, for example, the order of several tens of μm, for example 0.03 mm. Therefore, by applying acceleration to the crystal plate 2 in a direction intersecting therewith, a front end portion thereof bends.

Figure 2:
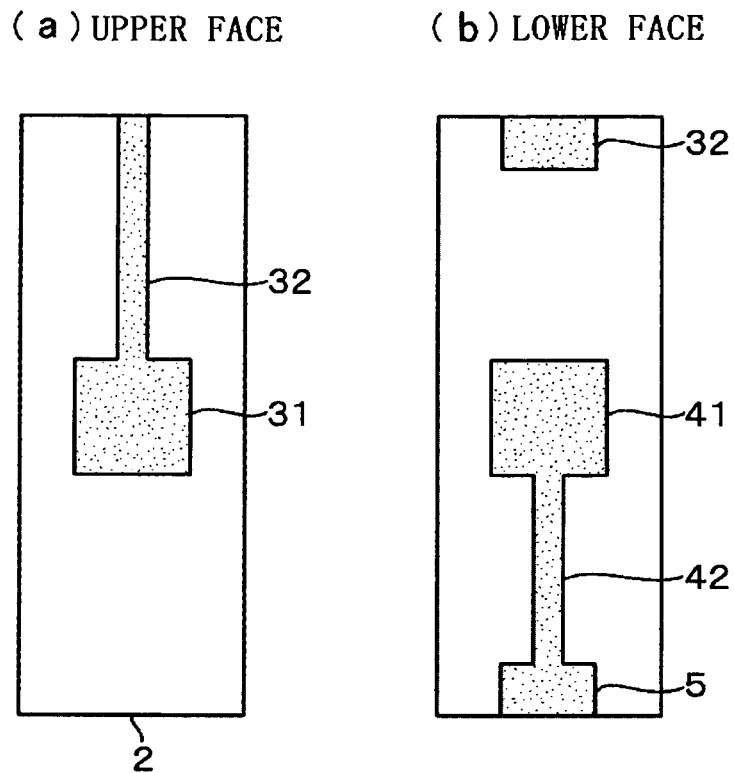
FIG. 2 is a plan view illustrating an upper face and a lower face of a crystal oscillator used in the basic structure.

On the crystal plate 2, one excitation electrode 31 is provided in a center portion on an upper face as illustrated in FIG. 2(a), and another excitation electrode 41 is provided in a portion facing the excitation electrode 31 on a lower face as illustrated in FIG. 2(b). A band-shaped lead-out electrode 32 is connected to the excitation electrode 31 on the upper face side, and this lead-out electrode 32 is folded at one end side of the crystal plate 2 to the lower face, thereby contacting the conductive adhesive 10. On the upper face of the pedestal 11, a conductive path 12 formed of a metal layer is provided, and this conductive path 12 is connected via an insulating substrate 13 supporting the container 1 to one end of an oscillation circuit 14 on the insulating substrate 13.

A band-shaped lead-out electrode 42 is connected to the excitation electrode 41 on the lower face side, and this lead-out electrode 42 is led out to another end side (front end side) of the crystal plate 2 and is connected to a movable electrode 5 for forming variable capacitor. On the other hand, a fixed electrode 6 for forming variable capacitor is provided on the container 1 side. A projecting part 7 formed of a convex-shaped crystal is provided on a bottom portion of the container 1. This projecting part 7 has a square shape when seen in a plan view.

The fixed electrode 6 is provided on this projecting part 7 to substantially face the movable electrode 5. The crystal plate 2 has a nature that when it vibrates excessively and its front end collides with the bottom portion of the container 1, it easily becomes chipped in a crystal mass due to a phenomenon called "cleavage". Accordingly, the shape of the projecting part 7 is decided so that a portion shifted toward a base end side (one end side) of the crystal plate 2 from the movable electrode 5 collides with the projecting part 7 when the crystal plate 2 vibrates excessively. In FIG. 1 and the like, it is depicted in a slightly changed image from the actual device, but when the container 1 is actually vibrated largely, a portion shifted toward the center side from the front end of the crystal plate 2 collides with the projecting part 7.

Figure 3:
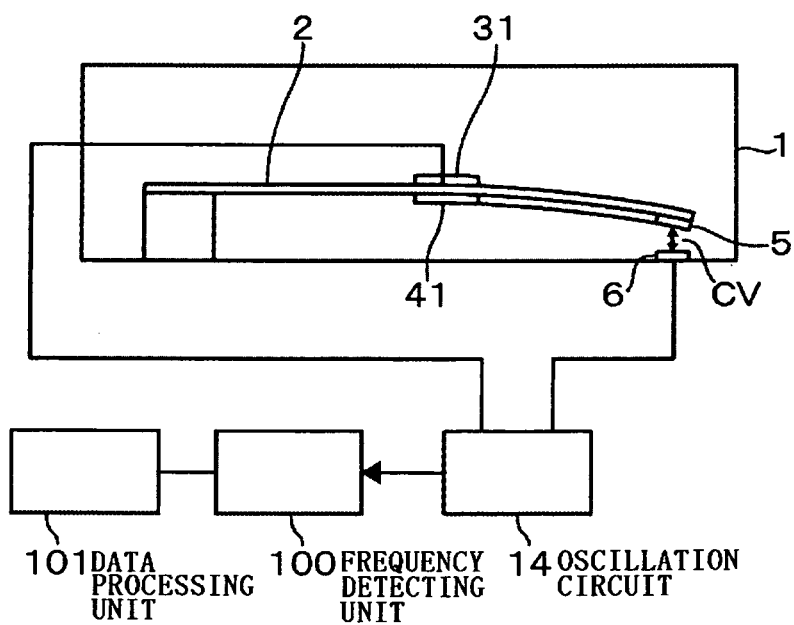
FIG. 3 is a block diagram illustrating a circuit structure of an acceleration detecting device.
Figure 4:
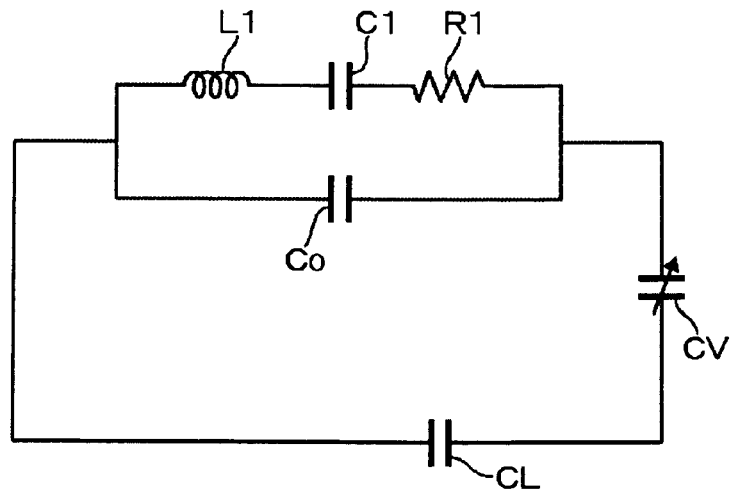
FIG. 4 is a circuit diagram illustrating an equivalent circuit of the acceleration detecting device.

The fixed electrode 6 is connected to another end of the oscillation circuit 14 via a conductive path 15 wired via the surface of the projecting part 7 and the insulating substrate 13. FIG. 3 illustrates a connection state of wires of the acceleration sensor, and FIG. 4 illustrates an equivalent circuit. L1 denotes series inductance corresponding to the mass of the crystal oscillator, C1 denotes series capacitance, R1 denotes a series resistance, C0 denotes effective parallel capacitance including inter-electrode capacitance, and CL denotes load capacitance of the oscillation circuit 14. The excitation electrode 31 on the upper face side and the excitation electrode 41 on the lower face side are connected to the oscillation circuit 14, but a variable capacitor Cv formed between the movable electrode 5 and the fixed electrode 6 intervenes between the excitation electrode 41 on the lower face side and the oscillation circuit 14.

A weight may be provided on the front end portion of the crystal plate 2 so as to increase a bending amount when acceleration is applied. In this case, the thickness of the movable electrode 5 may be increased to combine the weight, the weight may be provided separately from the movable electrode 5 on the lower face side of the crystal plate 2, or the weight may be provided on the upper face side of the crystal plate 2.

Here, according to the international standard IEC 60122-1, a general formula of the crystal oscillation circuit is represented as following formula (1).

$$FL = Fr \times (1+x)$$

$$x = (C1/2) \times 1/(C0+CL) \quad (1)$$

FL is an oscillation frequency when a load is applied to the crystal oscillator, and Fr is a resonance frequency of the crystal oscillator itself.

In this embodiment, as illustrated in FIG. 3 and FIG. 4, load capacitance of the crystal plate 2 is the sum of CL and Cv. Therefore, y represented by formula (2) is substituted for CL in formula (1).

$$y = 1/(1/Cv + 1/CL) \quad (2)$$

Therefore, when a bending amount of the crystal plate 2 changes from state 1 to state 2, and thereby the variable capacitor Cv changes from Cv1 to Cv2, a change ΔFL in frequency is represented by formula (3).

$$dFL = FL1 - FL2 = A \times CL^2 \times (Cv2 - Cv1)/(B \times C) \quad (3)$$

Here, $$A = C1 \times Fr/2,$$

$$B = C0 \times CL + (C0+CL) \times Cv1, \text{ and}$$

$$C = C0 \times CL + (C0+CL) \times Cv2.$$

Figure 16:
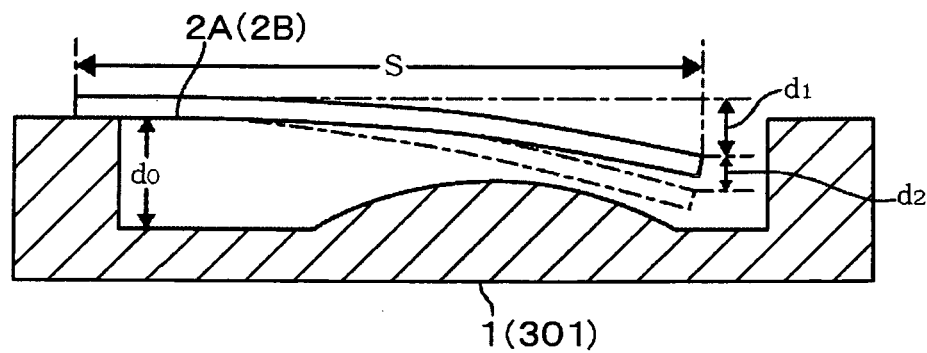
FIG. 16 is a cross-sectional side view illustrating how a crystal plate bends by external force and dimensions of respective parts in the embodiment.

Further, when a separation distance between the movable electrode 5 and the fixed electrode 6 when no acceleration is applied to the crystal plate 2, so to speak, when it is in a reference state is d1 (see FIG. 16), and the separation distance when acceleration is applied to the crystal plate 2 is d2 (see FIG. 16l, following formula (4) holds true.

$$Cv1 = S \times \in /d1$$

$$Cv2 = S \times \in /d2 \quad (4)$$

Here, S is the size of a facing area of the movable electrode 5 and the fixed electrode 6, and ∈ is a relative dielectric constant.

Since d1 is already known, it can be seen that dFL and d2 are in a correspondence.

The acceleration sensor as a sensor part of such an embodiment is in a state that the crystal plate 2 is slightly bent even in a state that no external force according to acceleration is applied. In addition, whether the crystal plate 2 is in a bent state or a horizontal state is kept is decided depending on the thickness of the crystal plate 2, or the like.

The acceleration sensor having such a structure is used as, for example, an acceleration sensor for detecting horizontal vibrations and an acceleration sensor for detecting vertical vibrations, where the former is installed so that the crystal plate 2 becomes vertical, and the latter is installed so that the crystal plate 2 becomes horizontal.

Figure 5:
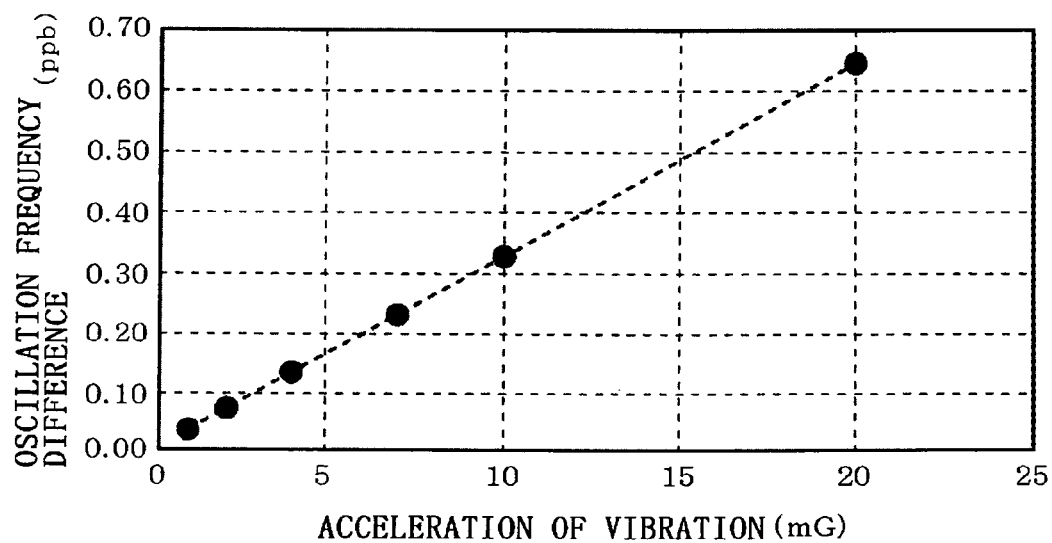
FIG. 5 is a characteristic diagram illustrating the relation between acceleration and a frequency difference obtained using the acceleration detecting device.

When an earthquake occurs or simulation vibrations are applied, the crystal plate 2 bends as illustrated by dashed lines in FIG. 1 or as illustrated by solid lines in FIG. 3. When a frequency detected by the frequency detecting unit 100 as a frequency information detecting unit in a state that no vibration is applied is FL1, and a frequency when vibration (acceleration) is applied is FL2, the difference in frequency FL1−FL2 is represented by formula (3). The present inventor checked the relation between (FL1−FL2)/FL1 and acceleration, and thereby obtained the relation illustrated in FIG. 5. Therefore, this proves that acceleration is obtained by measuring the difference in frequency.

In FIG. 3, 101 denotes a data processing unit formed of a personal computer for example, and this data processing unit 101 has a function to obtain a difference between a frequency f0 when acceleration is not applied to the crystal plate 2 and a frequency f1 when acceleration is applied based on frequency information, for example a frequency, obtained from a frequency detecting unit 100, and obtain acceleration with reference to a data table in which this frequency difference and acceleration are correlated. The frequency information is not limited to the change amount of the frequency difference, but may be the change rate of frequency [(f1−f0)/f0] as information corresponding to the difference in frequency.

With the structure illustrated in FIG. 1, when external force is applied to the crystal plate 2 and the crystal plate bends or the degree of bending changes, the distance between the movable electrode 5 on the crystal plate 2 side and the fixed electrode 6 facing this movable electrode 5 changes, and the capacitance between both the electrodes 5, 6 changes. Accordingly, this capacitance change and a deformation of the crystal plate 2 appear as a change in oscillation frequency of the crystal plate 2. As a result, even a slight deformation of the crystal plate 2 can be detected as a change in oscillation frequency, and thus external force applied to the crystal plate 2 can be measured with high accuracy and also the device structure is simple.

Embodiments of the Invention

Figure 6:
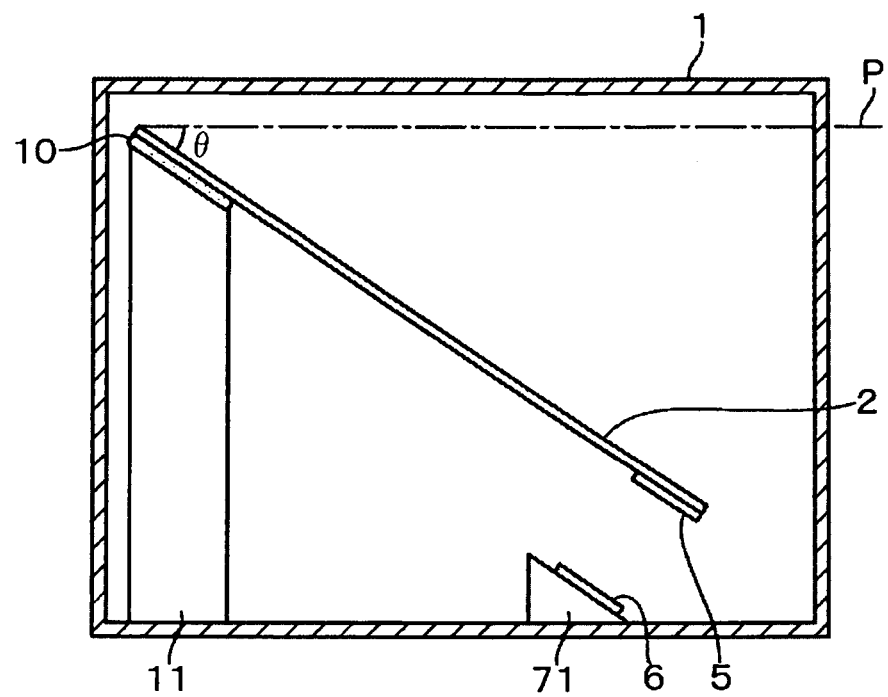
FIG. 6 is a cross-sectional side view illustrating an embodiment according to the present invention.

In an embodiment of the present invention, as illustrated in FIG. 6, the direction of the movable electrode 5 along a length direction of the crystal plate 2 (angle A formed between a face P and the movable electrode 5) before external force is applied is desirably at 30° to 60°, more desirably at 40° to 50° relative to a face P orthogonal to a direction in which intended (targeted) external force as a subject of measurement is applied. The fixed electrode 6 is provided on projecting part 71.

Figure 7:
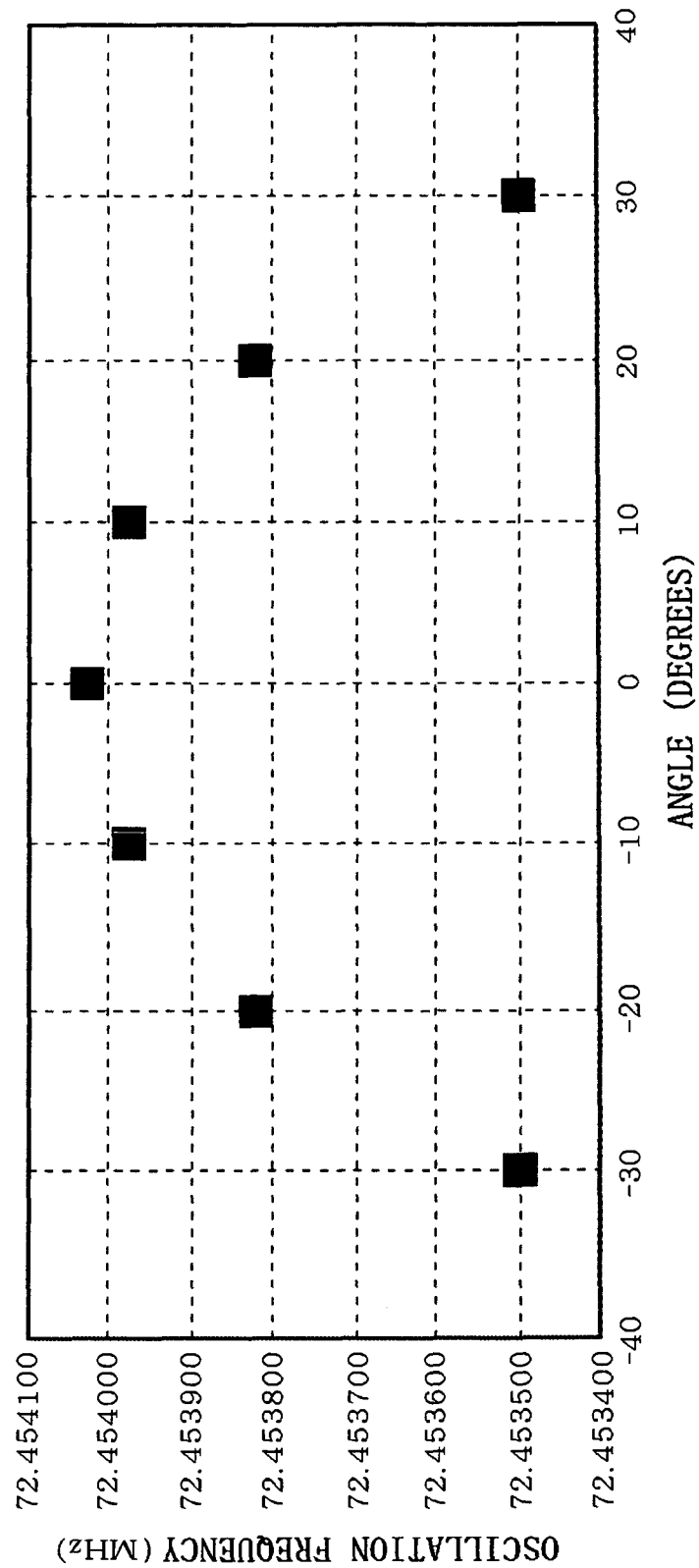
FIG. 7 is a characteristic diagram illustrating the relation between angle θ and sensitivity using the acceleration detecting device illustrated in FIG. 6.

FIG. 7 illustrates values of oscillation frequency when the same acceleration is applied to the crystal plate 2 in a direction orthogonal to the face P while varying the angle θ from 15° to 75°. 0° on the horizontal axis is θ=45°. As can be seen from the result of FIG. 7, it is speculated from these plots that the relation between the oscillation frequency and the angle θ draws a parabola, and hence the sensitivity is large when the angle θ is 30° to 60° (as values of the horizontal axis, −15° to +15°), and the sensitivity is larger when the angle θ is 40° to 50° (as values of the horizontal axis, −5° to +5°).

A reason for having such a result is speculated as follows. When an acceleration sensor 200 is inclined, as an inclination angle θ increases, a force component to bend the crystal plate 2 (force component in a thickness direction of the crystal plate 2) within external force decreases, and a force component in a longitudinal direction of the crystal plate 2 within the external force increases. Accordingly, when the angle θ is changed between 0° and 90° and external force of the same magnitude is detected, a change amount of the variable capacitor Cv decreases as the angle θ increases. Thus, increasing the angle θ becomes a main cause for decreasing the change amount of the oscillation frequency. However, on the other hand, as the angle θ increases, stress in the longitudinal direction of the crystal plate 2 increases, and thus increasing the angle θ also becomes a main cause for increasing the oscillation frequency. When the angle θ is in the range of 0° to 45°, a main cause due to the force component in the longitudinal direction within external force affects the detected oscillation frequency more than a main cause due to the force component in the thickness direction does, and this is reverse when the angle θ is 45° to 90°. Thus, it is conceivable that the relation between the angle θ and the oscillation frequency change amount becomes a parabola shape in which the change amount of the oscillation frequency becomes maximum when the angle θ is at 45°.

Figure 8:
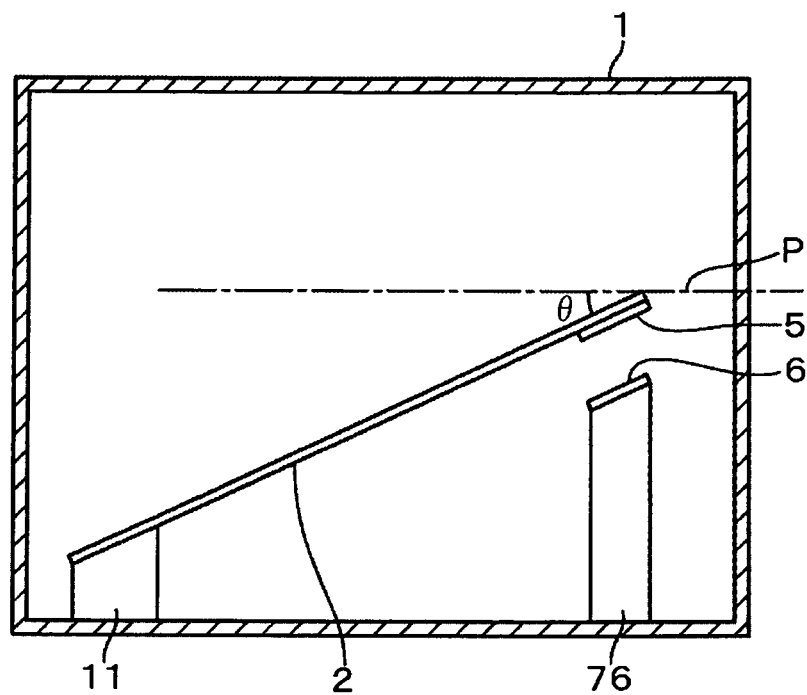
FIG. 8 is a cross-sectional side view illustrating a modification example of the embodiment.

When acceleration in a horizontal direction is checked, the acceleration sensor of FIG. 6 may be attached in a state of being rotated by 90 degrees. Further, the crystal plate 2 may be inclined upward as illustrated in FIG. 8, and in this case, the angle θ formed by the crystal plate 2 relative to the face P is set to, for example, 30° to 60°, preferably 40° to 50°. In FIG. 8 the fixed electrode 6 is provided on projecting part 76.

Figure 9:
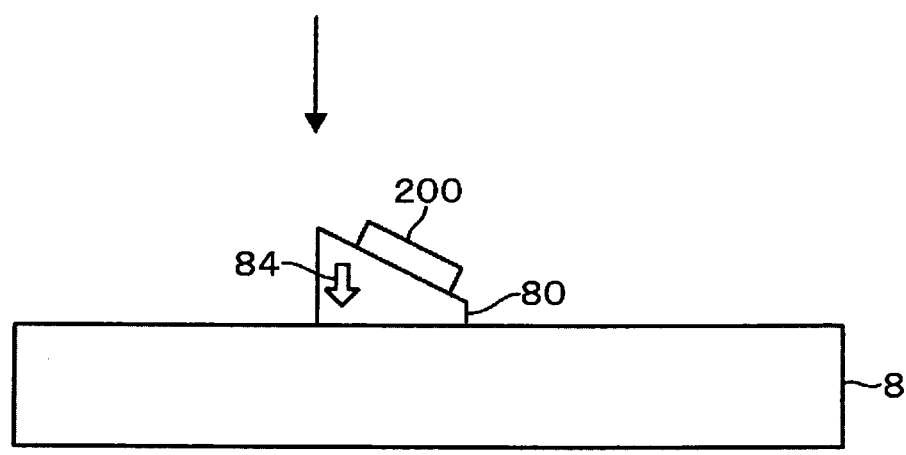
FIG. 9 is an explanatory view illustrating an example of a method of using the acceleration detecting device.
Figure 10:
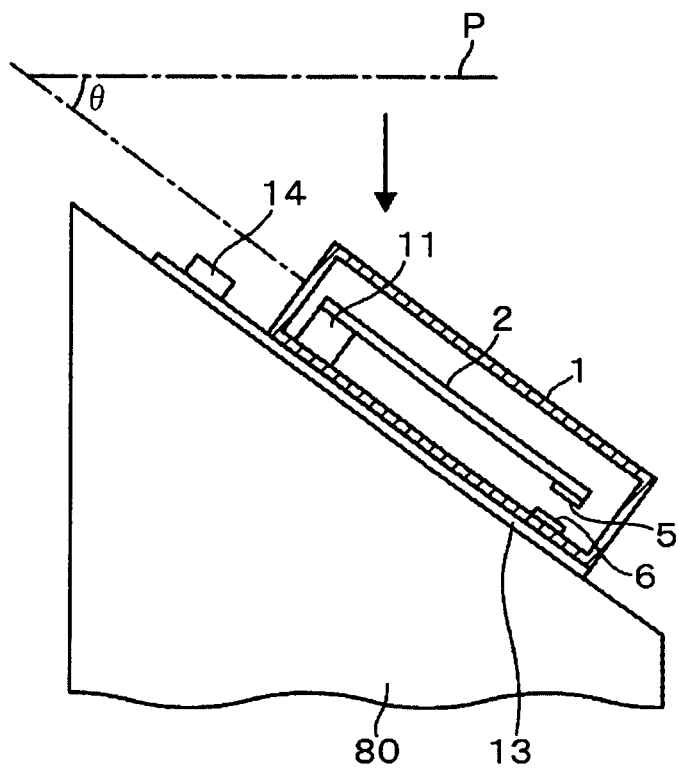
FIG. 10 is a cross-sectional side view illustrating an inside of the acceleration detecting device illustrated in FIG. 9.

Further, as illustrated in FIG. 9, an inclination relative to the face P may be made by fixing the acceleration sensor 200, in which the crystal plate 2 as illustrated in FIG. 1 is provided horizontally to a bottom portion attaching face of the container 1, in a slanted manner to a support member 8 via an attaching member 80. In this example, as illustrated in FIG. 10, the angle θ relative to the face P is made by fixing the acceleration sensor 200 on a sensor attaching face of the attaching member 80 which is inclined by angle θ relative to the face P. Also in this case, the angle θ formed between the crystal plate 2 and the face P (face perpendicular to the direction in which force as a subject of measurement is applied which is illustrated by an arrow in FIG. 9) is desirably in the already described angle range, and in this range, high sensitivity can be obtained.

The face P is, for example, a horizontal face when acceleration in a vertical direction is measured. Further, an arrow 84 is displayed as illustrated in FIG. 9 on the attaching member 80, and this display of arrow 84 is for specifying the direction of external force as a subject of measurement. For example, the direction indicated by this arrow 84 and the direction of the is movable electrode 5 form an angle at 45°, and the support member 8 is installed so that the direction indicated by this arrow 84 matches the direction of the external force.

Figure 11:
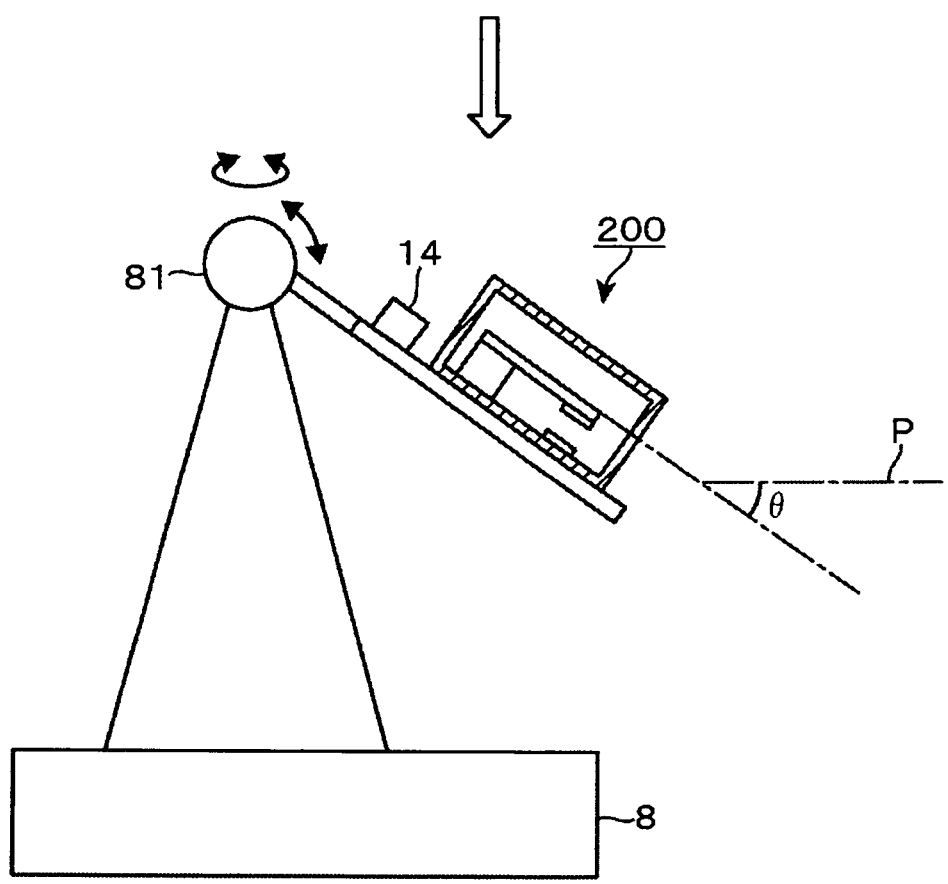
FIG. 11 is a cross-sectional side view illustrating a modification example of the embodiment according to the present invention.

As illustrated in FIG. 11, the angle θ may be made by fixing the acceleration sensor 200 to the support member 8 via a turning member 81. In this case, the angle θ can be easily adjusted corresponding to the direction in which external force is applied.

Figure 12:
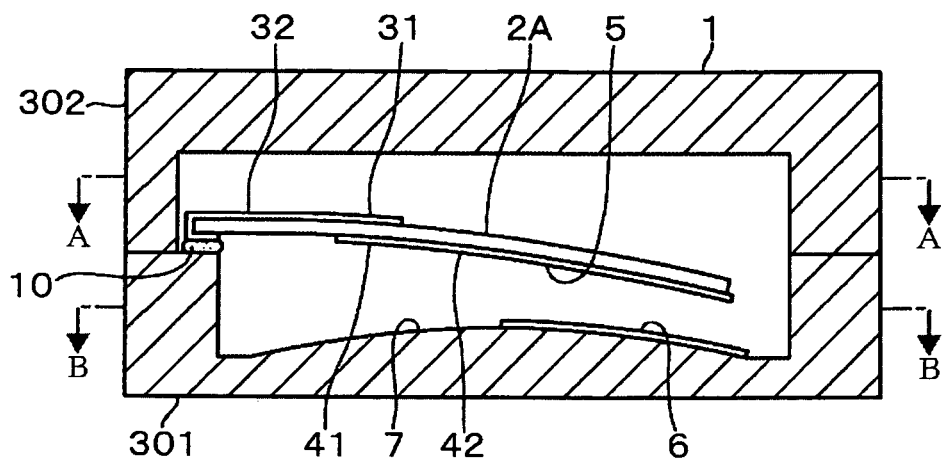
FIG. 12 is a cross-sectional side view illustrating an embodiment in which the external force detecting device according to the present invention is applied as an acceleration detecting device.
Figure 13:
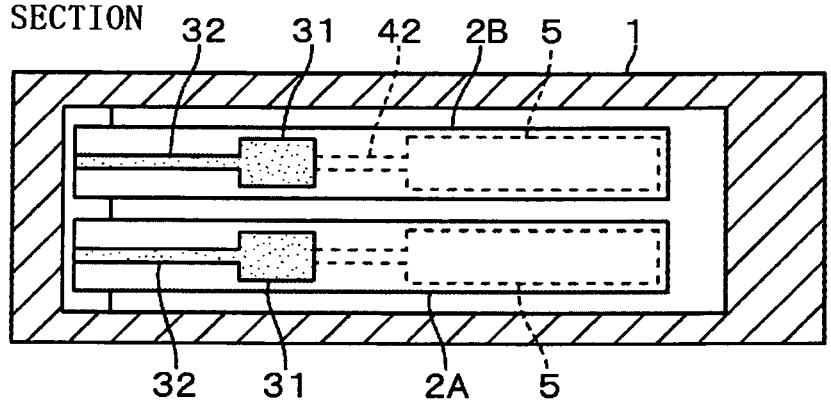
FIG. 13 is a cross-sectional plan view taken along a line A-A in FIG. 12.

Another example of the acceleration sensor is illustrated in FIG. 12. The acceleration sensor 200 illustrated in FIG. 12 is mounted on the attaching member 80 as illustrated in already-described FIG. 9 and FIG. 10, and is attached to the support member 8 in a manner of being inclined at the angle θ relative to the face P. This embodiment differs from the above-described basic structure in that there are provided two groups of the crystal plate 2, the excitation electrodes 31, 41, the movable electrode 5, the fixed electrode 6, and the oscillation circuit 14, which are already described. 301 denotes a lower part constituting a base forming a lower side of the container 1, and 302 denotes an upper part constituting a lid forming an upper side of the container 1. Regarding the crystal plate 2 and the oscillation circuit 14, symbol "A" is added to parts of one group, and symbol "B" is added to parts of the other group. In FIG. 12, the crystal plate 2 on one side is illustrated, and the view seen from a side is the same as FIG. 1. When an inner part of the pressure sensor of FIG. 12 is seen in a plan view, a first crystal plate 2A and a second crystal plate 2B are laterally disposed in parallel as illustrated in FIG. 13.

Figure 14:
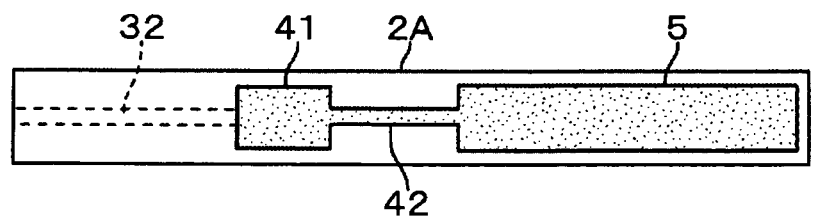
FIG. 14 is a plan view illustrating a rear face side of the crystal plate used in the embodiment.

Since the crystal plates 2A, 2B have the same structure, the one crystal plate 2A will be described. On one face side (upper face side) of the crystal plate 2A, a lead-out electrode 32 having a small width extends from one end side toward the other end side, and on a front end portion of this lead-out electrode 32, one excitation electrode 31 is formed in a rectangular shape. Then, on another face side (lower face side) of the crystal plate 2A, another excitation electrode 41 is formed facing the one excitation electrode 31 as illustrated in FIG. 13 and FIG. 14, and a lead-out electrode 42 having a narrow width extends toward the front end side of the crystal plate 2A in the excitation electrode 41. Further, on the front end side of this lead-out electrode 42, a movable electrode 5 in a strip shape for forming variable capacitor is formed. The electrode 31 and so on are formed of a conductor film, for example a metal film.

Figure 15:
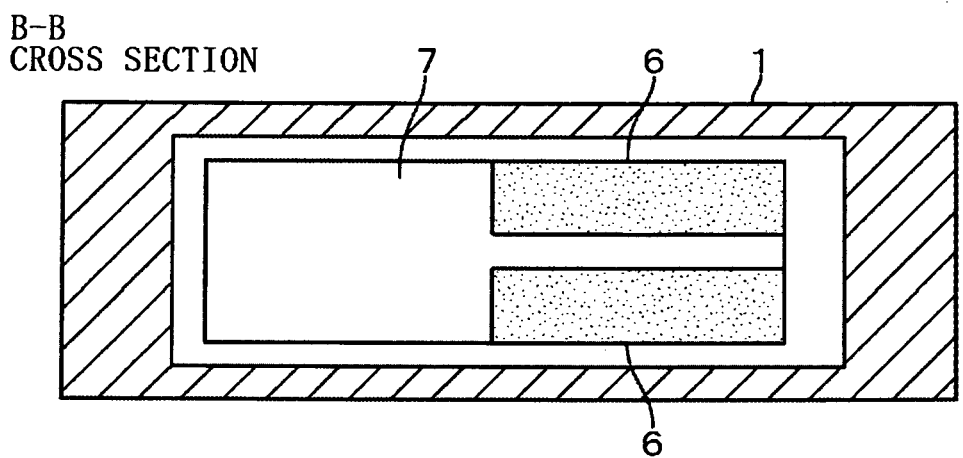
FIG. 15 is a cross-sectional plan view taken along a line B-B in FIG. 12.

On a bottom portion of the container 1, a projecting part 7 formed of a convex-shaped crystal similar to that in FIG. 1 is provided, but a lateral width of the projecting part 7 is set to the size corresponding to the arrangement of the two crystal plates 2A, 2B. That is, the projecting part 7 is set to a size including a projection area of the two crystal plates 2A, 2B. Then, as illustrated in FIG. 13 and FIG. 15, on the projecting part 7, a fixed electrode 6 in a strip shape is provided for each of the movable electrode 5 of the crystal plate 2A and the movable electrode 5 of the crystal plate 2B. In addition, in FIG. 12 and so on, the bending shape of the crystal plate 2A (2B) is not described accurately since priority is given to easiness in understanding of the structure. However, in the case where it is made with dimensions which will be described later, a portion shifted toward the center side from the front end of the crystal plate 2A (2B) collides with the projecting part 7 when the crystal plate 2A (2B) vibrates excessively.

Regarding the crystal plate 2A (2B) and a surrounding area thereof, an example of dimensions of respective parts will be described with reference to FIG. 16. A length dimension S and a width dimension of the crystal plate 2A (2B) are 20 mm and 1.6 mm, respectively. The thickness of the crystal plate 2A (2B) is, for example, 30 µm. Assuming that a support face on the one end side of the crystal plate 2A (2B) is set in parallel with a horizontal face, the crystal plate bends by its own weight when it is in a state of being left without applying acceleration, where a bending amount d1 thereof is of the order of 151 µm for example, and a depth d0 of a recessed space in a lower part of the container 1 is 156 µm for example. Further, a height dimension of the projecting part 7 is of the order of 105 µm for example. These dimensions are mere examples.

Figure 17:
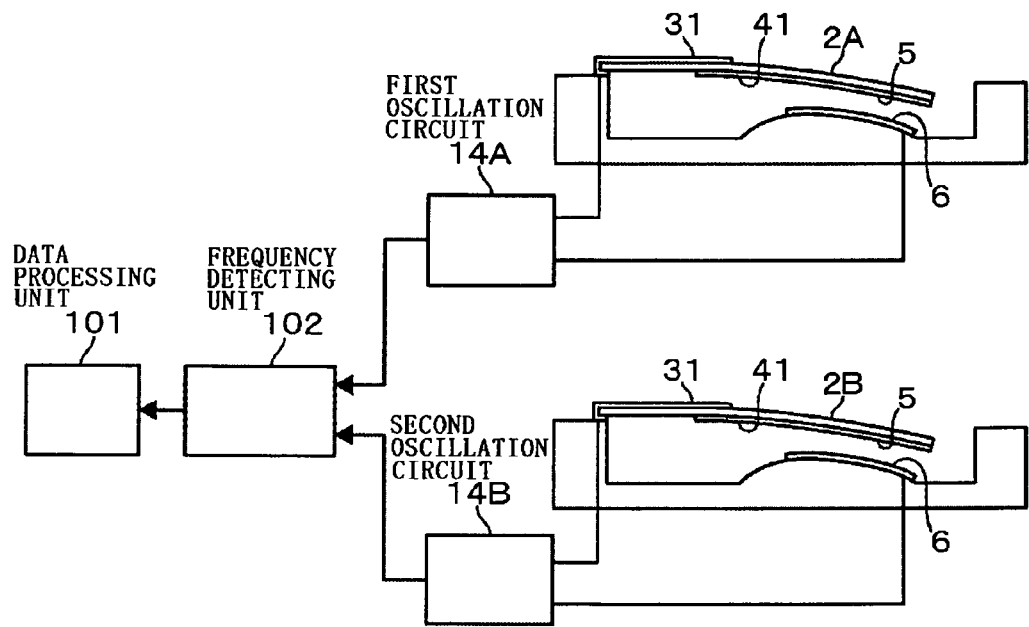
FIG. 17 is a block circuit diagram illustrating a circuit of the acceleration detecting device according to the embodiment.
Figure 18:
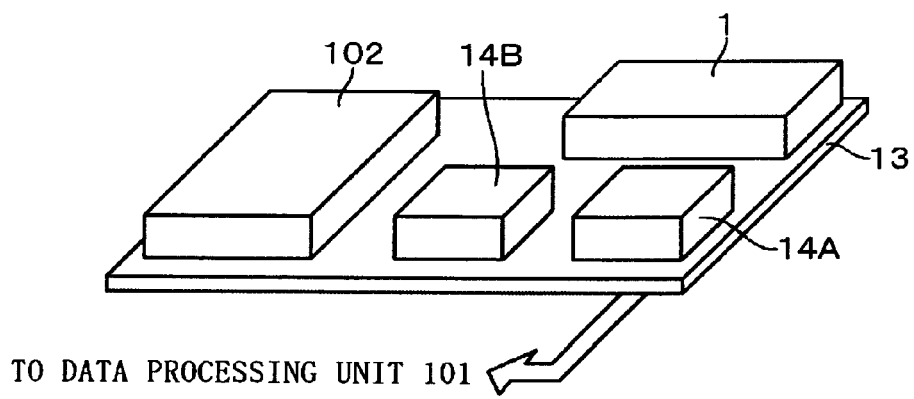
FIG. 18 is an exterior view illustrating an external appearance of a part of the acceleration detecting device according to the embodiment.

FIG. 17 illustrates a circuit of the acceleration detecting device of this embodiment. Further, FIG. 18 illustrates an external appearance of a part of the acceleration detecting device. A difference from the above-described basic structure is that a first oscillation circuit 14A and a second oscillation circuit 14B are connected corresponding to the first crystal plate 2A and the second crystal plate 2B, respectively, and an oscillation loop including the oscillation circuit 14 (14B), the excitation electrodes 31, 41, the movable electrode 5, and the fixed electrode 6 is formed for each of the first crystal plate 2A and the second crystal plate 2B. Outputs from these oscillation circuits 14A, 14B are sent to a frequency information detecting unit 102, where a difference in oscillation frequency or a difference in change rate of frequency from the oscillation circuits 14A, 14B is detected.

The change rate of frequency means as follows. Assuming that the frequency in the reference state in which the crystal plate 2A bends by its own weight is called a reference frequency in the oscillation circuit 14A, the change rate is a value represented by the change amount of frequency/the reference frequency when the crystal plate 2A further bends by acceleration and the frequency changes, and is represented in units of ppb for example. Similarly, the change rate of frequency is also calculated for the crystal plate 2B, and the difference between these change rates is outputted to the data processing unit 101 as information corresponding to frequency. In the data processing unit 101, for example, data in which differences in change rate and magnitudes of acceleration are correlated are stored in a memory, and acceleration can be detected based on these data and a difference in change rate.

In an example of the relation between a bending amount (difference in height level of the front end portion between when the crystal plate is extending straight and when it is bending) of the crystal plate 2A (2B) and a change amount of frequency, if the front end of the crystal plate 2A (2B) changes by the order of, for example, $10^{-5}$ µm, the change amount of frequency is 0.65 ppb when the oscillation frequency is 70 MHz. Therefore, even quite small external force, for example acceleration, can be detected accurately.

According to the above-described embodiment, in addition to the effect in the above-described basic structure, since the crystal plate 2A and the crystal plate 2B are disposed in the same temperature environment, even when the frequency of each of the crystal plate 2A and the crystal plate 2B changes by temperature, the change amount of this is cancelled, and as a result, only a frequency change amount based on bending of the crystal plates 2A, 2B can be detected. Thus, there is an effect of high detection accuracy.

In the example of FIG. 13, the fixed electrodes 6 are provided corresponding respectively to the crystal plate 2A and the crystal plate 2B, but in another possible structure, for the one crystal plate 2B the movable electrode 5 and the fixed electrode 6 may be omitted. In this case, for the one crystal plate 2B, the excitation electrode 41 is connected to the second oscillation circuit 14B without intervention of the variable capacitor CV. In a structure in which two groups of excitation electrodes 31, 41 are provided thus (structure in which two crystal oscillators are provided), the respective groups may be provided on a common crystal plate instead of using a crystal plate for each group.

Modification Examples and Application Examples of the Present Invention

Further modification examples of the present invention are described in FIG. 19 to FIG. 22.

Figure 19:
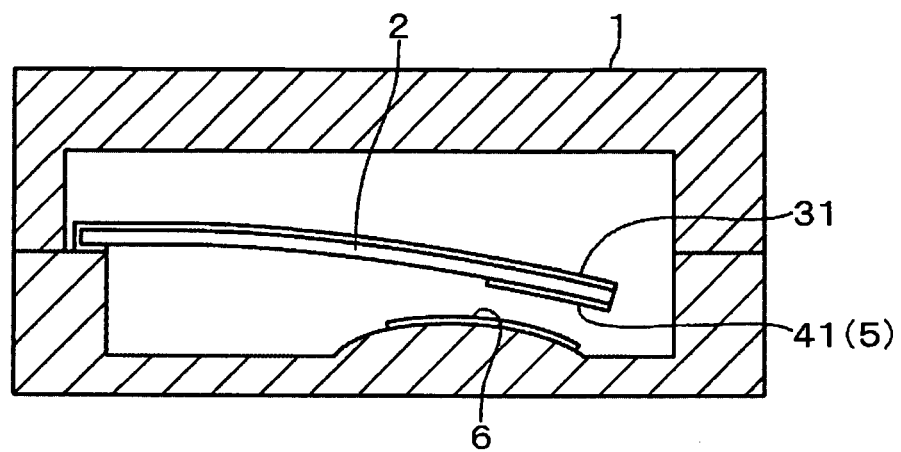
FIG. 19 is a cross-sectional side view illustrating another modification example of the present invention.

In an acceleration sensor illustrated in FIG. 19, the excitation electrodes 31, 41 of the crystal plate 2 are formed on the front end side of the crystal plate 2, and the excitation electrode 41 on the lower face side combines the movable electrode 5.

Figure 20:
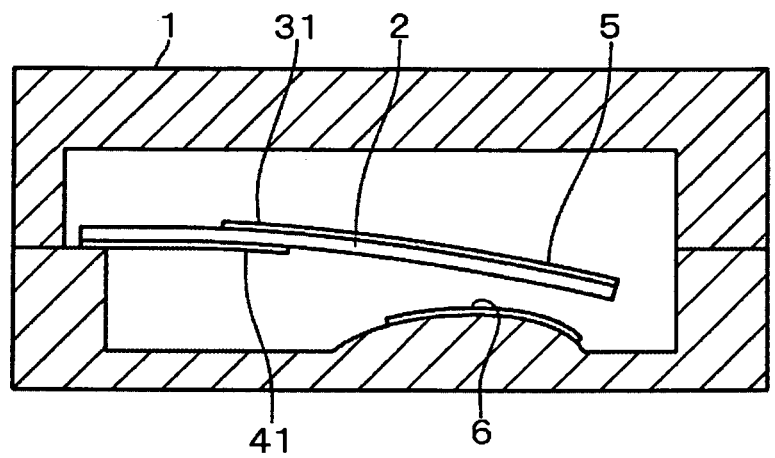
FIG. 20 is a cross-sectional side view illustrating another modification example of the present invention.

An acceleration sensor illustrated in FIG. 20 employs a structure in which the upper face and the lower face of the crystal plate 2A (2B) used in the above-described embodiment as the crystal oscillator including the crystal plate 2 are reversed. In this case, the crystal plate 2 intervenes between the movable electrode 5 and the fixed electrode 6, but similar operation and effect can be obtained in this structure.

Figure 21:
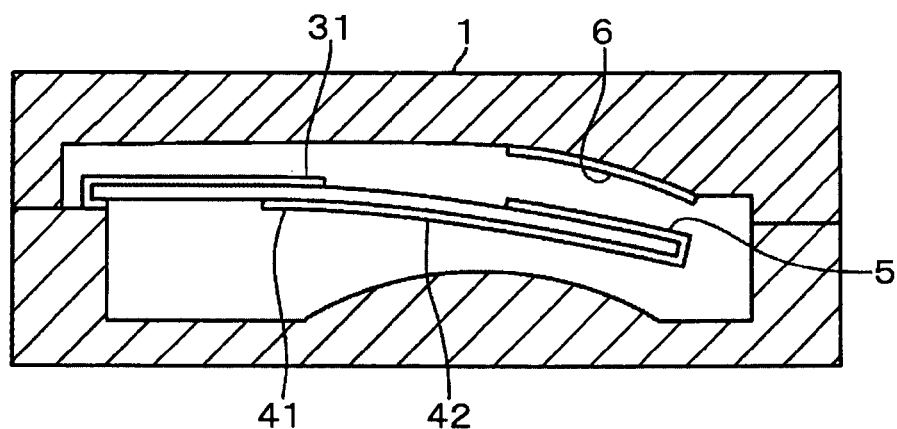
FIG. 21 is a cross-sectional side view illustrating another modification example of the present invention.
Figure 22:
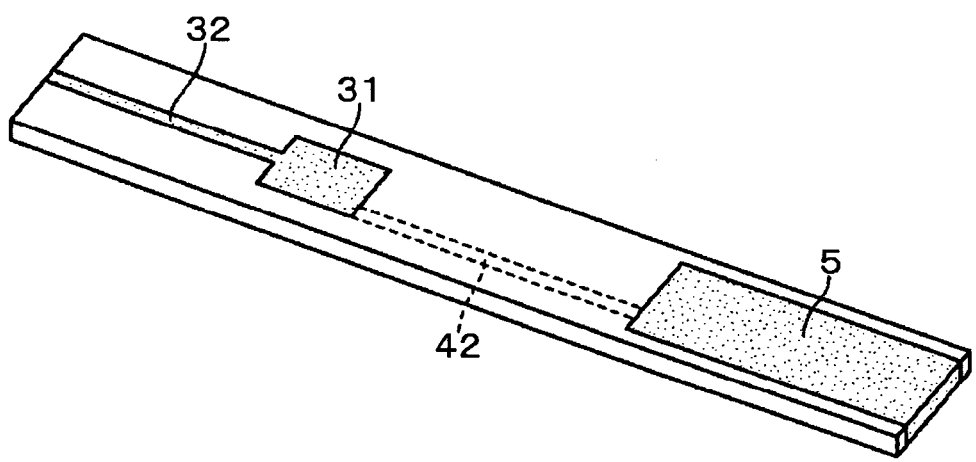
FIG. 22 is a perspective view illustrating a crystal plate used in an acceleration detecting device illustrated in FIG. 21.

An acceleration sensor illustrated in FIG. 21 has a structure in which in the crystal plate 2A (2B) used in the above-described embodiment, as illustrated in FIG. 22, the movable electrode 5 on the lower face side is turned around to the upper face side, and the fixed electrode 6 is provided on an inner wall upper face side of the internal space of the container 1 so as to face this movable electrode 5. Also in this case, similar operation and effect can be obtained.

Figure 25:
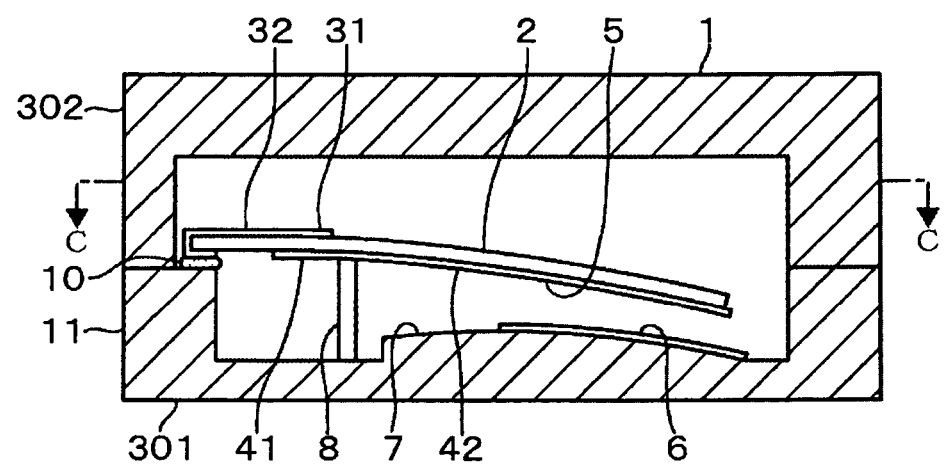
FIG. 25 is a cross-sectional side view illustrating a main part according to another embodiment of the present invention.
Figure 26:
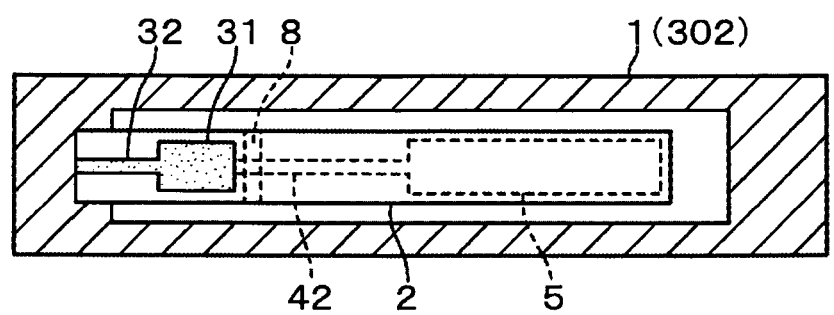
FIG. 26 is a cross-sectional plan view taken along a line C-C in FIG. 25.

FIG. 25 and FIG. 26 illustrate another embodiment of the present invention. This embodiment is an example of supporting a position between a portion having a role as a crystal oscillator and a portion where bending occurs due to external force in the crystal plate 2 with a support part provided on a lower portion of the container 1 corresponding to a base. That is, a support portion by this support part in the crystal plate 2 is located between the portion where the excitation electrodes 31, 41 are provided and the portion where the movable electrode 5 is provided. Then, preferably, a large distance from the support portion to the front end of the crystal plate 2 is secured so that the degree of bending of the crystal plate 2 when external force is applied to the crystal plate 2 becomes large, that is, high sensitiveness is obtained.

In the acceleration sensor illustrated in FIG. 25 and FIG. 26, a square-shaped support part 8 is provided on the bottom portion of the container 1, and an upper face of this support part 8 supports a portion shifted toward the front end side of the crystal plate 2 by 0.1 mm to several mm for example from the excitation electrode 41 on the lower face of the crystal plate 2. Preferably, a lateral width of the support part 8 is equal to or larger than a width dimension of the crystal plate 2. However, when it is possible to exhibit a function to sufficiently prevent bending of the portion where the excitation electrodes 31, 41 are arranged, it may be smaller than the width dimension of the crystal plate 2. A height dimension of the support part 8 is set to a dimension such that, for example, it contacts the lower face of the crystal plate 2 in a state that the crystal plate 2 extends horizontally from the upper face of the pedestal 11.

In FIG. 25, the structure in the container is described in an exaggerated manner, and thus presents a slightly different image from the structure of an example of an actual external force sensor. As examples of dimensions of the support part 8, the height is 0.5 mm to 1 mm for example, the thickness is 0.3 mm, and the lateral width is 1.6 mm which is the same as the width of the crystal plate 2. These dimensions are examples, and are determined according to the structure of the container 1, the installation position of the crystal plate 2, and the like.

The support part 8 and the lower face (face on the side facing the fixed electrode 6) of the crystal plate 2 are fixed to each other with, for example, a conductive adhesive or a fixing material such as a low dielectric glass. In addition, a structure may be employed in which the support part 8 and the lower face of the crystal plate 2 are not fixed to each other.

As an approach to provide the support part 8, there is an approach to form it by, for example, etching when the lower portion 301 of the container 1 is produced, but the support part 8 may be produced separately from the lower portion 301 and be bonded with an adhesive.

Figure 27:
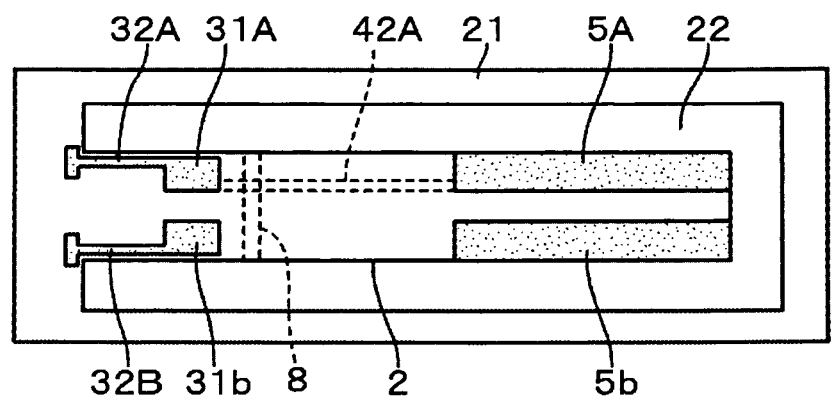
FIG. 27 is a plan view illustrating a main part of still another embodiment of the present invention.

Further, the structure using the support part 8 may be applied to the example illustrated in FIG. 13 to FIG. 17, which is an example of providing two crystal oscillators and obtaining a difference in oscillation frequency of these crystal oscillators, or the like. In this case, the structure is such that, for each of the crystal plates 2A, 2B of each group, the portion between the excitation electrodes 31, 41 and the movable electrode 5 is supported by the support part 8 as illustrated in FIG. 25 and FIG. 26. The support part 8 may be provided separately for each of the crystal plates 2A, 2B, or the crystal plates 2A, 2B may be supported by a common support part 8 extending from a left edge of the crystal plate 2A to a right edge of the crystal plate 2B. FIG. 27 illustrates a structure in which the support part 8 is used in a structure in which two crystal oscillators are formed on a common crystal plate 2.

Here, a sample was created in which the excitation electrode 41 is connected directly to the oscillation circuit in the structure illustrated in FIG. 25, and an oscillation frequency f0 when it is placed on a horizontal surface and an oscillation frequency f10 when it is placed on a surface which is inclined so that the front end side of the crystal plate 2 becomes lower by 10 degrees than the horizontal surface were measured plural times. Values of (f0−f10)/f0 as a change ratio of frequency were 0.1 ppb to 5 ppb.

On the other hand, a similar test was performed on a sample in the case of not providing the support part 8 in the aforementioned sample, and values of (f0−f10)/f0 as a change ratio of frequency were 8 ppb to 45 ppb. From this result, it can be seen that the structure provided with the support part 8 is smaller in ratio of the change amount of frequency due to bending of the vibrating portion (portion where the excitation electrodes 31, 41 are provided) of the crystal plate 2A to the change amount of the oscillation frequency when the crystal plate 2 bends due to external force. This result can be regarded as it is based on that when the front end side of the support part 8 bends in the crystal plate 2, the vibrating portion barely bends due to the existence of the support part 8.

A change in frequency of the vibrating portion is not reproducible, and thus the structure provided with the support part 8 as described above enables to obtain a frequency change which corresponds to bending of the crystal plate 2 further accurately.

In the foregoing, the present invention is not limited to measurement of acceleration, and can be applied to measurement of magnetic force, measurement of the degree of inclination of an object to be measured, measurement of flow speed of fluid, measurement of wind speed, and the like.

A structure example of the case of measuring magnetic force will be described. A film of magnetic material is formed on the portion between the movable electrode 5 and the excitation electrode 41 on the crystal plate 2, and the crystal plate 2 is structured to bend when this magnetic material is located in a magnetic field.

Further, regarding measurement of the degree of inclination of the object to be measured, the base supporting the crystal plate 2 or 2A, 2B is inclined at various angles in advance, and frequency information is obtained for each inclination angle, thereby enabling detection of an inclination angle from the frequency information when the base is installed on a surface to be measured.

Moreover, when the crystal plate 2 is exposed in fluid such as gas or liquid, flow speed can be detected via frequency information according to the bending amount of the crystal plate. In this case, the thickness of the crystal plate 2 is determined according to a measuring range of the flow speed, or the like. Furthermore, the present invention can be applied to the case of measuring gravity.

Figure 23:
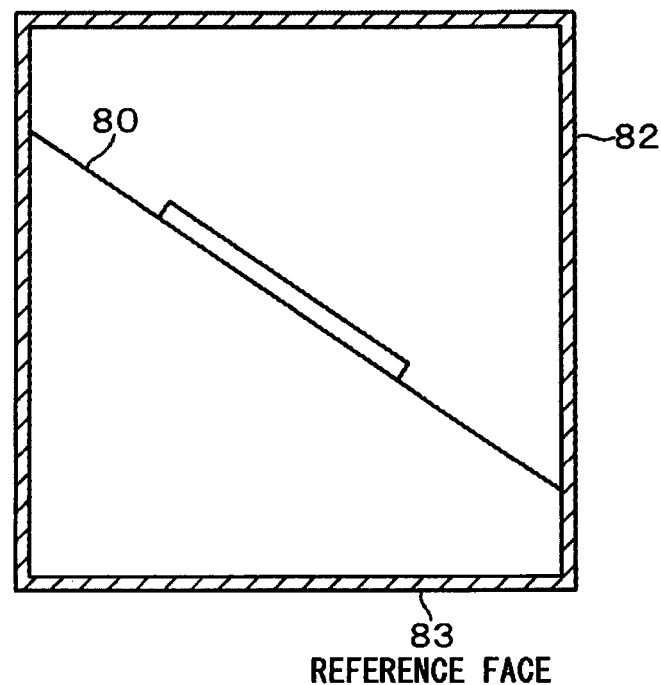
FIG. 23 is a schematic view describing a direction indicating part in the present invention.
Figure 24:
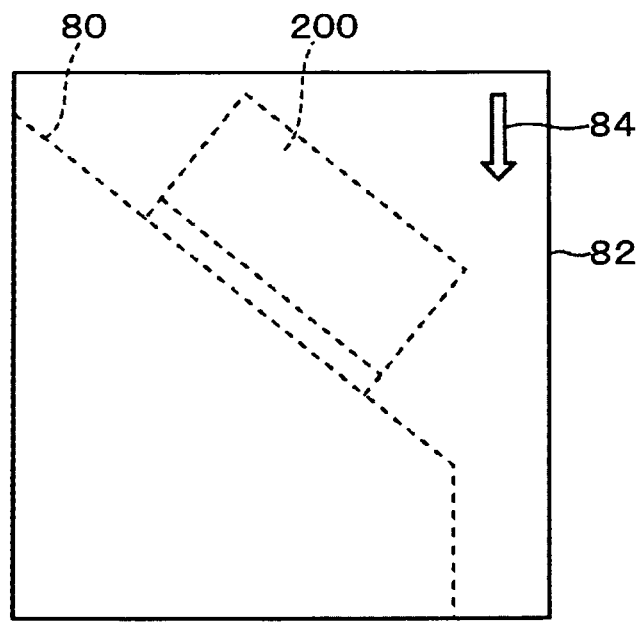
FIG. 24 is a schematic view describing the direction indicating part in the present invention.

The present invention includes a direction indicating part which indicates an attaching direction for allowing attachment of the external detecting device in a manner of inclining at the aforementioned angle θ. Specific examples of this direction indicating part are illustrated in FIG. 23 and FIG. 24. In FIG. 23, a reference face 83 as an attachment face is set on a case 82 of an external force detecting device including the acceleration sensor 200, and the inclination at the aforementioned angle θ is made by attaching the device in contact with an object to be measured via this reference face 83. For example, when acceleration in a vertical direction is measured, this reference face 83 may be installed on a horizontal face. Further, when flow speed of fluid is measured, the case 82 may be installed so that the reference face 83 is orthogonal to the direction in which the fluid flows. In this example, the reference face 83 corresponds to the direction indicating part. In FIG. 24, an arrow 83 as a reference for aligning a direction of external force as a subject of measurement is depicted on an outer wall of the case 82, and this arrow 83 corresponds to the direction indicating part.

What is claimed is:

1. An external force detecting method using a sensor comprising:
   a cantilever piezoelectric plate supported at one end on a base;
   one excitation electrode and another excitation electrode provided on a portion less than an entirety of one face side and a portion less than an entirety of another face side, respectively, of the piezoelectric plate so as to vibrate this piezoelectric plate;
   an oscillation circuit connected electrically to the one excitation electrode;
   a movable electrode for forming variable capacitor provided in a portion separated from the one end side on the piezoelectric plate and connected electrically to the other excitation electrode; and
   a fixed electrode provided separately from the piezoelectric plate to face the movable electrode and connected to the oscillation circuit, where capacitance between the fixed electrode and the movable electrode is changed by bending of the piezoelectric plate to thereby form a variable capacitor; and
   wherein the movable electrode is provided at the other end of the piezoelectric piece at a greater distance than the one excitation electrode and the other excitation electrode;
   the method comprising the steps of:
   setting the sensor so that an angle formed between a face orthogonal to a direction of external force as an intended subject of measurement and a length direction of the piezoelectric plate in the movable electrode is 30° to 60°;
   detecting a signal as frequency information corresponding to an oscillation frequency of the oscillation circuit by a frequency information detecting unit; and
   finding the magnitude of the external force acting on the piezoelectric plate on the basis of the difference between the frequency detected with the frequency information detecting unit when an external force that is the subject of measurement is not applied to the piezoelectric plate, and the frequency detected with the frequency information detecting unit when an external force that is the subject of measurement is applied to the piezoelectric plate.

2. The external force detecting method according to claim 1, wherein the angle formed between a face orthogonal to a direction of external force as an intended subject of measurement and a length direction of the piezoelectric plate in the movable electrode is 40° to 50°.

3. The external force detecting method according to claim 1, wherein a support part is provided on the base to support a portion between the excitation electrodes and the movable electrode on a lower face side of the piezoelectric plate, so as to prevent bending of the portion where the excitation electrodes are provided when external force is applied to the piezoelectric plate.

4. The external force detecting method according to claim 3, wherein a front end of the support part and the piezoelectric plate are fixed to each other.

5. The external force detecting method according to claim 1, wherein the sensor comprises on an internal wall part on a side where the fixed electrode is provided in the container, a projecting part allowing a contact of a portion shifted toward one end side from the other end side of the piezoelectric plate to restrict bending of this portion when the piezoelectric plate bends excessively, thereby avoiding collision of the other end of the piezoelectric plate with the inner wall part of the container.

6. The external force detecting method according to claim 1, wherein a projecting part is provided on the inner wall, on the side where the fixed electrode is provided within the container, and
   wherein with respect to a face of the projecting part which faces the piezoelectric plate, a vertical cross-sectional shape in a length direction of the piezoelectric plate is a mound shape.

* * * * *